US011550527B2

(12) United States Patent
Yang et al.

(10) Patent No.: US 11,550,527 B2
(45) Date of Patent: Jan. 10, 2023

(54) MEDIA FILE PROCESSING METHOD FOR DISPLAY DEVICE AND DISPLAY DEVICE

(71) Applicant: Hisense Visual Technology Co., Ltd., Shandong (CN)

(72) Inventors: Luming Yang, Shandong (CN); Zhiqiang Li, Shandong (CN); Yongfu Chen, Shandong (CN); Shaofeng Tan, Shandong (CN); Weiming Ju, Shandong (CN)

(73) Assignee: HISENSE VISUAL TECHNOLOGY CO., LTD., Shandong (CN)

( * ) Notice: Subject to any disclaimer, the term of this patent is extended or adjusted under 35 U.S.C. 154(b) by 465 days.

(21) Appl. No.: 16/711,026

(22) Filed: Dec. 11, 2019

(65) Prior Publication Data
US 2020/0310731 A1 Oct. 1, 2020

Related U.S. Application Data

(63) Continuation of application No. PCT/CN2019/107086, filed on Sep. 20, 2019.

(30) Foreign Application Priority Data

Mar. 28, 2019 (CN) .......................... 201910245707.1

(51) Int. Cl.
G06F 3/14 (2006.01)
G06F 3/16 (2006.01)
(Continued)

(52) U.S. Cl.
CPC ................ G06F 3/14 (2013.01); G06F 3/165 (2013.01); H04L 67/55 (2022.05); H04W 4/20 (2013.01);
(Continued)

(58) Field of Classification Search
CPC .......... G06F 3/14; G06F 3/165; H04L 67/55; H04W 4/20; H04W 52/0229;
(Continued)

(56) References Cited

U.S. PATENT DOCUMENTS 8,205,225 B2 * 6/2012 Nishioka .............. H04N 21/435
725/111
9,762,842 B2 * 9/2017 Chun ..................... G06F 3/1462
(Continued)

FOREIGN PATENT DOCUMENTS

CN 102799693 A 11/2012
CN 104333788 A 2/2015
(Continued)

OTHER PUBLICATIONS

International Search Report for PCT/CN2019107086 dated Dec. 11, 2019.
(Continued)

Primary Examiner — Amancio Gonzalez
(74) Attorney, Agent, or Firm — Workman Nydegger

(57) ABSTRACT

Disclosed are a media file processing method for a display device and the display device. The method includes receiving, by the display device being in a standby mode, a wakeup signal broadcasted from a mobile device through a wireless module of the display device; and triggering, according to the wakeup signal, an electrical level change so that the display device is configured to enter into a customized mode where the display device is started but a screen of the display device is not lighted. The display device in the customized mode is discoverable by the mobile device. The method includes receiving, by the display device in the customized mode, a push instruction for playing a media file transmitting from the mobile device, lighting the screen, and
(Continued)

playing the media file according to the push instruction so as to make the display device enter a normal operating mode.

18 Claims, 10 Drawing Sheets

(51) Int. Cl.
    *H04W 4/20*           (2018.01)
    *H04W 52/02*         (2009.01)
    *H04L 67/55*          (2022.01)
    *H04W 84/12*         (2009.01)
    *H04W 88/02*         (2009.01)

(52) U.S. Cl.
    CPC ........ *H04W 52/0229* (2013.01); *H04W 84/12* (2013.01); *H04W 88/02* (2013.01)

(58) Field of Classification Search
    CPC ....... H04W 84/12; H04W 88/02; H04W 4/80; G09G 2330/026; Y02D 30/70
    USPC .......................................... 713/323
    See application file for complete search history.

(56) References Cited

U.S. PATENT DOCUMENTS

| | | | |
|---|---|---|---|
| 9,893,960 B2* | 2/2018 | Rubio | H04L 41/0896 |
| 10,057,632 B2* | 8/2018 | Seo | H04L 65/1094 |
| 10,575,369 B2* | 2/2020 | Price | H04M 3/53333 |
| 10,664,127 B2* | 5/2020 | Anker | G06F 3/0346 |
| 10,687,161 B2* | 6/2020 | Proctor, Jr. | H04N 5/268 |
| 10,939,237 B2* | 3/2021 | Dadhaniya | H04W 4/06 |
| 2012/0278603 A1 | 11/2012 | Lee | |
| 2015/0128194 A1* | 5/2015 | Kuang | H04N 21/43615 |
| | | | 725/81 |
| 2015/0312648 A1* | 10/2015 | Zhang | H04N 21/4131 |
| | | | 725/110 |
| 2018/0007308 A1* | 1/2018 | Yu | H04N 21/42227 |
| 2018/0262793 A1* | 9/2018 | Lau | H04N 21/43076 |
| 2018/0307460 A1* | 10/2018 | Barton | H04R 27/00 |
| 2019/0086991 A1 | 3/2019 | Lee et al. | |
| 2019/0208279 A1* | 7/2019 | Anker | H04N 21/482 |

FOREIGN PATENT DOCUMENTS

| | | |
|---|---|---|
| CN | 105025365 A | 11/2015 |
| CN | 106203030 A | 12/2016 |
| CN | 106569656 A | 4/2017 |
| CN | 107562174 A | 1/2018 |
| CN | 109240107 A | 1/2019 |
| CN | 110022495 A | 7/2019 |

OTHER PUBLICATIONS

First Chinese Office Action with English translation regarding 201910245707.1 dated Nov. 19, 2020, 21 pages.

* cited by examiner

MEDIA FILE PROCESSING METHOD FOR DISPLAY DEVICE AND DISPLAY DEVICE

RELATED APPLICATIONS

This application is a continuation of International Application No. PCT/CN2019/107086, file Sep. 20, 2019, which claims priority to Chinese Patent Application No. 201910245707.1, filed Mar. 28, 2019. The aforementioned patent applications are hereby incorporated by reference in their entireties.

FIELD

The disclosure relates to display technology and in particular relates to a media file processing method for a display device and the display device.

BACKGROUND

In order to meet individual demands of users and improve the experience of the users, there are more and more scenes for interaction between a mobile device and a display device. For example, a user may select to push a group of photos on the display device to browse the photos on a full screen when browsing the group of photos on the mobile device, and the display device has a relatively larger display screen compared with the mobile device, so that the photos on the larger screen may provide better browsing experience, and it is convenient for multiple users to watch the photos together.

In the interaction scenarios between a mobile device and a display device, for example, in a scenario where a mobile device pushes a group of photos to a display device, it is required the display device is required to be in a work state instead of a standby state to show the photos. It should be noted that, for the display device in the work state, the user may press a power key on a remote controller to shut down the display device so that the display device enters the standby state; and for the display device in the standby state, the user may press the power key on the remote controller so that the display device is woken up from the standby state to the work state.

SUMMARY

The present disclosure describes embodiments of a method for a display device playing a media file. The method includes receiving, by a display device being in a standby mode, a wakeup signal broadcasted from a mobile device through a wireless module of the display device. The display device includes a memory and a processor in communication with the memory. The method includes triggering, by the display device according to the wakeup signal, an electrical level change so that the display device is configured to enter into a customized mode where the display device is started but a screen of the display device is not lighted. The display device in the customized mode is discoverable by the mobile device so as to associate the display device with the mobile device. The method includes receiving, by the display device in the customized mode, a push instruction for playing a media file transmitting from the mobile device, lighting the screen of the display device, and playing the media file according to the push instruction so as to make the display device enter a normal operating mode.

The present disclosure also describes embodiments of a display device for playing a media file. The display device include a memory storing instructions; and a processor in communication with the memory. When the processor executes the instructions, the processor is configured to cause the display device to, while the display device is in a standby mode, receive a wakeup signal broadcasted from a mobile device through a wireless module in the display device. When the processor executes the instructions, the processor is configured to cause the display device to trigger an electrical level change according to the wakeup signal, so that the display device is configured to enter into a customized mode where the display device is started but a screen of the display device is not lighted. The display device in the customized mode is discoverable by the mobile device so as to associate the display device with the mobile device. When the processor executes the instructions, the processor is configured to cause the display device to, while the display device is in the customized mode, receive a push instruction for playing a media file transmitting from the mobile device, light the screen of the display device, and play the media file according to the push instruction so as to make the display device enter a normal operating mode.

DETAILED DESCRIPTION OF THE EMBODIMENTS

The detailed description of the disclosure is explained in detail below in combination with accompanying drawings. It should be understood that the detailed description described herein only intends to describe and explain the disclosure, rather than to limit the disclosure.

Figure 1A:
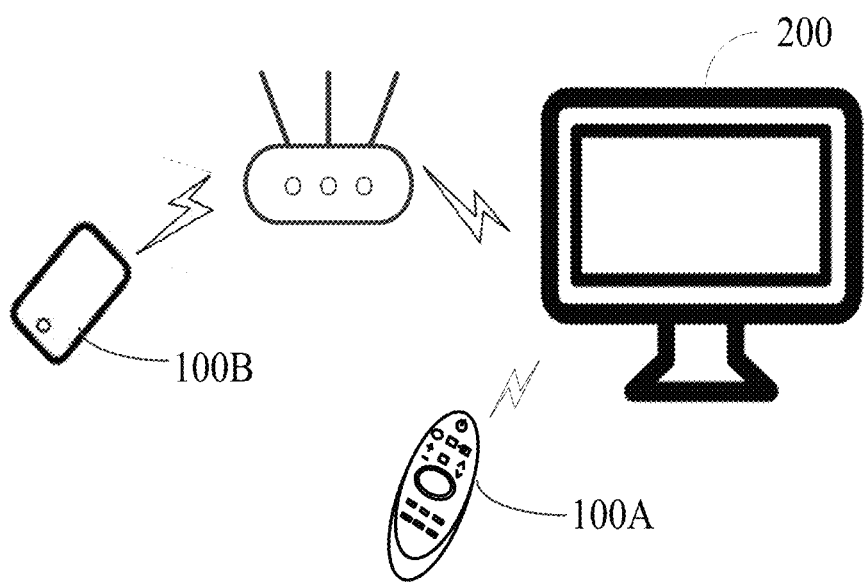
FIG. 1A is a structural schematic diagram of a system architecture according to some embodiments of the disclosure.

FIG. 1A is a structural schematic diagram of a system architecture according to some embodiments of the disclosure.

As shown in FIG. 1A, the system architecture includes a control apparatus 100, a display device 200 and a router. The control apparatus 100 may be a remote controller 100A and a mobile device 100B functioning as a controller for controlling the display device. The display device 200 has broadcast receiving function and network television function with a computer support function.

The remote controller 100A is capable of receiving an operation instruction input from a user and converting the operation instruction into a control instruction which may be identified and responded by the display device 200.

The remote controller 100A is capable of controlling the display device 200 in a wireless or any other wired mode such as an infrared protocol communication, a Bluetooth communication and other short-distance communication protocol. The user may input the operation instruction through keys on the remote controller, voice and a control panel, for example, the user may input a corresponding operation instruction through a power key, a volume up key volume down key, a channel control key, an upper/lower/left/right movement key, a voice input key, a menu key and the like to control the display device 200.

In one implementation, the display device 200 and the mobile device 100B may be connected to a local area network by the router. In another implementation, the mobile device 100B may also establish wireless communication connection with the display device 200 and transmit a control instruction and data to the display device by the wireless communication connection. The mobile device may be a device such as a smartphone, a tablet computer, a personal digital assistant (PDA), an intelligent wearing device and the like.

The mobile device 100B may communicate with the display device 200 by installing a software application, based on a network communication protocol, and furthermore, thereby achieving one-to-one control operation and data communication. For example, the mobile device 100B and the display device 200 may establish a control instruction protocol, and functions of keys arranged on the remote controller 100A are realized by operating various functional keys or virtual buttons on a user interface provided on the mobile device 100B. Or an audio/video content displayed on the mobile device 100B may be transmitted to the display device 200, so that a synchronous display function is realized.

Figure 1B:
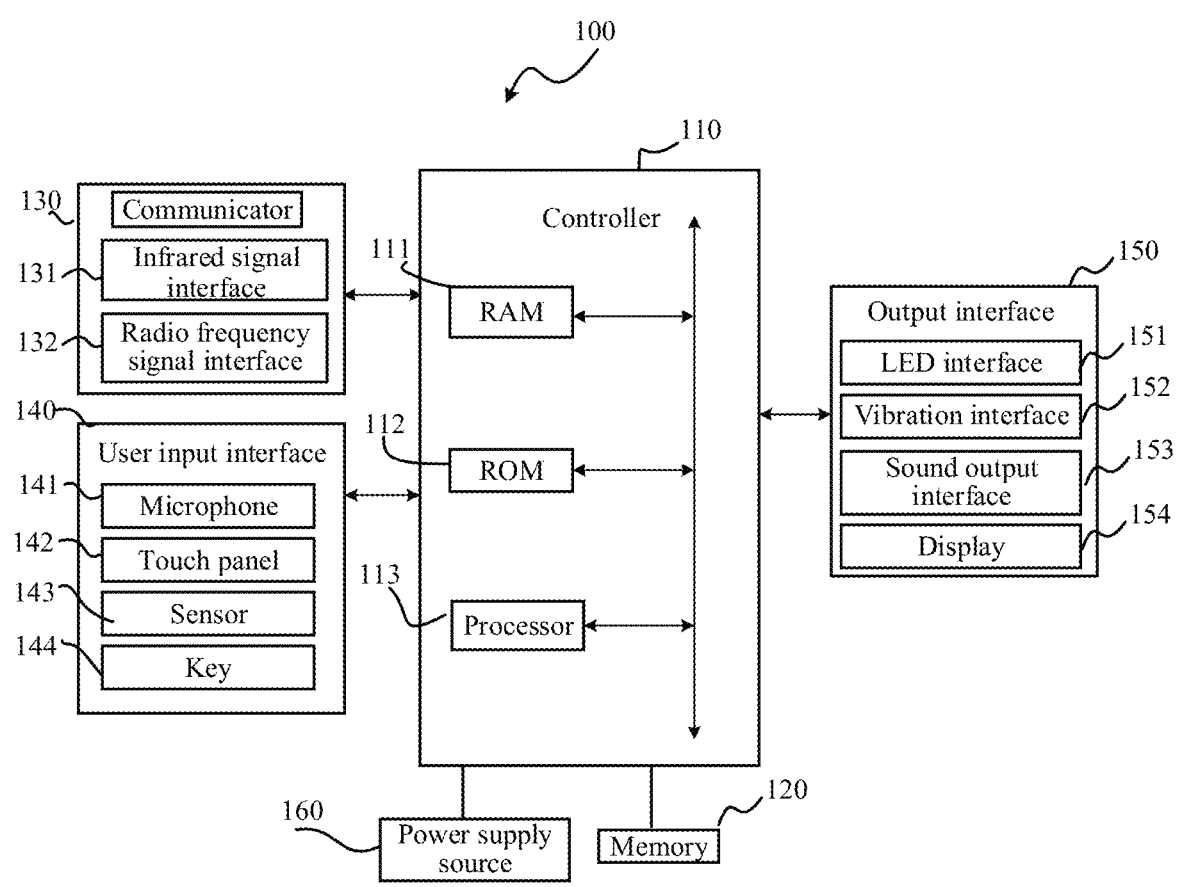
FIG. 1B illustrates a configuration block diagram of a control apparatus 100 in FIG. 1A.

FIG. 1B illustrates a configuration block diagram of a control apparatus 100. As shown in FIG. 1B, the control apparatus 100 includes a controller 110, a memory 120, a communicator 130, a user input interface 140, an output interface 150 and a power supply source 160.

The controller 110 includes a random access memory (RAM) 111, a read-only memory (ROM) 112, a processor 113, a communication interface and a communication bus. The controller 110 is used for controlling the working and operation of the control apparatus 100 and functions of communication cooperation among all internal parts as well as external and internal data processing.

In some examples, when a user presses the keys arranged on the remote controller 100A or a user touches a touch panel arranged on the remote controller 100A, the controller 110 generates control signal corresponding to the above actions and transmitting the signal to the display device 200 for control.

The memory 120 is used for storing various operating programs, data and applications for driving and controlling the control apparatus 100 under the control of the controller 110. The memory 120 is configured for storing various control instructions input from the user.

The communicator 130 realizes control signal and data signal communication with the display device 200 under the control of the controller 110. For example, the control apparatus 100 sends a control signal (such as a touch signal or a button signal) to the display device 200 by the communicator 130, and the control apparatus 100 may receive a signal transmitted from the display device 200 by the communicator 130. The communicator 130 may include an infrared signal interface 131 and a radio frequency signal interface 132. For example, when the infrared signal interface is provided, a user input instruction is required to be converted into an infrared control signal according to an infrared control protocol, and the infrared control signal is transmitted to the display device 200 by an infrared transmitting module. For example, when the radio frequency signal interface is provided, the user input instruction is required to be converted into a digital signal, and then, the digital signal is transmitted to the display device 200 by a radio frequency transmitting terminal after being modulated according to a radio frequency control signal modulation protocol.

The user input interface 140 may include at least one of a microphone 141, a touch panel 142, a sensor 143, a key 144 and the like, so that the user may input an instruction for controlling the display device 200 to the control apparatus 100 by voice, touch, gestures, press and the like.

The output interface 150 is used for outputting the user instruction received from the user input interface 140 to the display device 200 or outputting an image or voice signal received from the display device 200. Herein, the output interface 150 may include an LED interface 151, a vibration interface 152 for generating vibration, a sound output interface 153 for outputting a sound, a display 154 for outputting an image and the like. For example, the controller 100A is configured for receiving an output signal such as audio, video or data from the output interface 150 and displaying the output signal on the display 154 in an image form, outputting the output signal on the sound output interface 153 in an audio form or outputting the output signal on the vibration interface 152 in a vibration form.

The power supply source 160 is configured to provide operation power support for various elements of the control apparatus 100 under the control of the controller 110. The forms may be batteries and correlated control circuits.

Figure 1C:
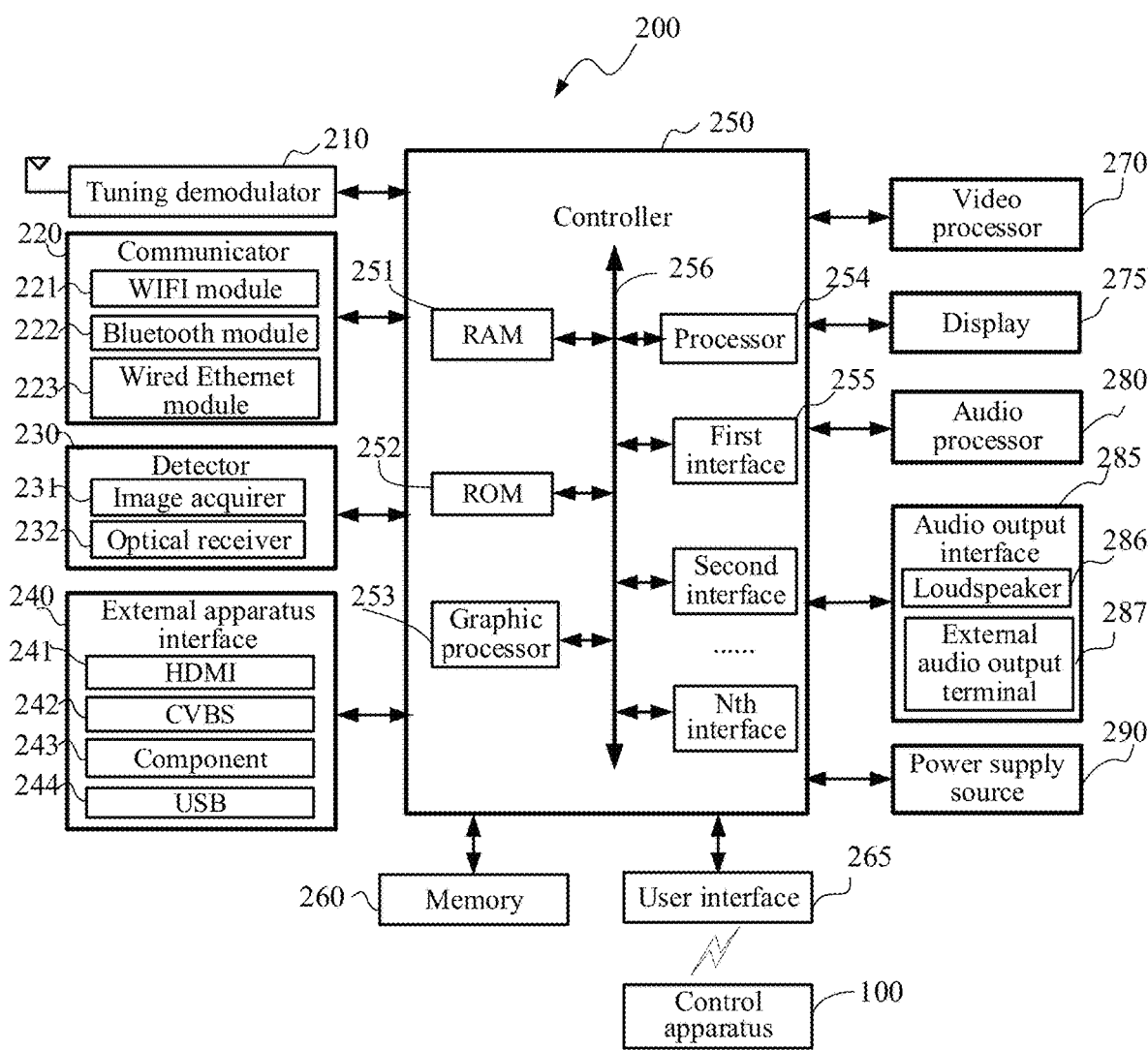
FIG. 1C illustrates a configuration block diagram of a display device 200 in FIG. 1A.

FIG. 1C illustrates a hardware configuration block diagram of a display device 200. As shown in FIG. 1C, the display device 200 may include a tuning demodulator 210, a communicator 220, a detector 230, an external apparatus interface 240, a controller 250, a memory 260, a user interface 265, a video processor 270, a display 275, an audio processor 280, an audio input interface 285 and a power supply source 290.

The tuning demodulator 210 receives radio and television signals in a wired or wireless mode, and perform modulation and demodulation processing such as amplification, frequency mixing and resonance oscillation and is configured for demodulating an audio/video signal carried in a television channel selected by the user from the plurality of wireless or wired radio and television signals, and additional information (such as EPG data).

The tuning demodulator 210 is configured for processing the frequency corresponding to the television channel selected by the user and the television signals carried by the frequency according to the selection of the user and the control of the controller 250.

The tuning demodulator 210 is configured for receiving the signals in various forms such as terrestrial broadcasting, wired broadcasting, satellite broadcasting and Internet broadcasting; receiving signals in a digital modulation mode or an analog modulation mode classified based on modulation types; and receiving an analog signal and a digital signal classified based on signal types.

In some other exemplary embodiments, the tuning demodulator 210 may also be located in an external device such as an external set-top box. Thus, the television signals are output by the set-top box after being modulated and demodulated and are input to the display device 200 by the external apparatus interface 240.

The communicator 220 is a component for realizing communication with the external device or an external server according to various communication protocols. For example, the display device 200 is configured for transmitting content data to the external device connected with the communicator 220 or browsing and downloading the content data from the external device connected with the communicator 220. The communicator 220 may include network communication protocols or near-field communication protocol modules such as a wireless module 221, a Bluetooth communication protocol module 222 and a wired Ethernet communication protocol module 223, so that the communicator 220 is capable of receiving the control signal of the control apparatus 100 according to the control of the controller 250 and converting the control signal into a WIFI signal, a Bluetooth signal, a radio frequency signal and the like. In one implementation, the wireless module 221 may include a WiFi module.

The detector 230 is a component of the display device 200, configured to acquire external environment parameters or a signal associated with the outside. The detector 230 may include an image acquirer 231 such as a camera and a webcam configured to acquire an external environment scene to adaptively change display parameters of the display device 200 and acquiring the attribute of the user or a gesture interacting with the user to realize the function of interaction between the display device and the user. The detector 230 may further include an optical receiver 232 configured to acquire the intensity of an environmental light for self-adaption to the change of the display parameters of the display device 200.

In some other exemplary embodiments, the detector 230 may further include a temperature sensor, for example, the display device 200 is capable of adaptively regulating the display color temperature of an image by sensing an environmental temperature. In some examples, the color temperature of the image displayed by the display device 200 may be regulated to a cool color tone when the environmental temperature is relatively high; and the color temperature of the image displayed by the display device 200 may be regulated to a warm color tone when the environmental temperature is relatively low.

In some other exemplary embodiments, the detector 230 may further include a sound acquirer such as a microphone which may be configured to receive the sound of the user, such as a voice signal for the user to control the control instruction of the display device 200; or the sound acquirer may be configured to acquire an environmental sound for identifying the type of an environmental scene so that the display device 200 is capable of adapting to environmental noise.

The external apparatus interface 240 is a component for the controller 210 to control data transmission between the display device 200 and the external device. The external apparatus interface 240 may be connected with the external device such as a set-top box, a game apparatus and a notebook computer in a wired/wireless mode and is capable of receiving data such as a video signal (such as a motion image), an audio signal (such as music) and additional information (such as EPG) of the external device.

The external apparatus interface 240 may include one or more of a high-definition multimedia interface (HDMI) terminal 241, a composite video blanking and synchronizing (CVBS) terminal 242, an analog or digital component terminal 243, a universal serial bus (USB) terminal 244, a component terminal (not shown in the figure) and a red-green-blue (RGB) terminal (not shown in the figure).

The controller 250 controls the work of the display device 200 and responds to the operation of the user by operating various software control programs (such as an operation system and various application programs) stored in the memory 260.

As shown in FIG. 1C, the controller 250 includes a random access memory (RAM) 251, a read-only memory (ROM) 252, a graphic processor 253, a CPU 254, a communication interface 255 and a communication bus 256, wherein the RAM 251, the ROM 252, the graphic processor 253, the CPU 254 and the communication interface 255 are connected with the communication bus 256.

The ROM 252 is used for storing various system starting instructions. For example, when a boot signal is received, a power supply of the display device 200 starts, the CPU 254 executes the system starting instructions in the ROM 252 and copies the operation system stored in the memory 260 into the RAM 251 so that the operation system starts operating. After the starting of the operation system is finished, the CPU 254 copies the various application programs in the memory 260 into the RAM 251 and then starts to operate and start the various application programs.

The graphic processor 253 is used for generating various graphic objects such as icons, operation menus and user input instruction display graphics. The graphic processor 253 may include a calculator used for calculation by receiving various interaction instructions input by the user and further displaying various objects according to display attributes and a renderer used for generating various objects obtained based on the calculator and displaying a rendering result on the display 275.

The CPU 254 is used for executing the operation system and application program instructions stored in the memory 260 and executing the processing of various application programs, data and contents according to the received user input instruction so that various audio/video contents are finally displayed and played.

In some other exemplary embodiments, the CPU 254 may include a plurality of processors. The plurality of processors may include a main processor and one or more sub-processors. The main processor is used for executing some initialization operations of the display device 200 in a preloading mode of the display device and/or an operation of displaying a picture in a normal mode. The one or more sub-processor is used for executing an operation in a state such as the standby mode of the display device.

The communication interface 255 may include a first interface to an nth interface. The interfaces may be network interfaces connected with the external device by network.

The controller 250 is configured for controlling the overall operation of the display device 200. For example, in response to receiving a user input command for selecting a GUI object displayed on the display 275, the controller 250 may execute an operation associated with the objected selected by the user input command.

The object may be any one of selectable objects such as a hyperlink and an icon. The operation associated with the selected object is, for example, displaying a link page, a document and an image or executing an application corresponding to the object. The user input command used for selecting the GUI object may be a command input by various input apparatuses (such as a mouse, a keyboard and a touch panel) connected with the display device 200 or a voice command corresponding to voice given by the user.

The memory 260 is used for storing various types of data, software programs or application programs for driving and controlling the operation of the display device 200. The memory 260 may include a volatile and/or non-volatile memory. While a term "memory" includes the memory 260, the RAM 251 and the ROM 252 of the controller 250 or a memory card in the display device 200.

In some other exemplary embodiments, the memory 260 is used for storing an operation program for driving the controller 250 in the display device 200, storing various application programs built in the display device 200 and downloaded from the external device by the user and storing data such as visual effect images of a selector used for configuring various GUIs of the display 275 and various objects associated with the GUIs and selecting the GUI objects.

In some embodiments, the memory 260 is used for storing drive programs and associated data of the tuning demodulator 210, the communicator 220, the detector 230, the external apparatus interface 240, the video processor 270, the display 275, the audio processor 280 and the like as well as external data (such as audio/video data) received from the external apparatus interface and user data (such as key information, voice information and touch information) received from the user interface.

In some embodiments, the memory 260 is specifically used for storing software and/or programs associated with the operation system (OS), and the software and/or programs may include a kernel, middleware, an application programming interface (API) and/or application programs. In some examples, the kernel is configured for controlling or managing system resources and functions (such as the middleware, the API or the application programs) implemented by other programs; and meanwhile, the kernel may be provided with an interface to allow the middleware, the API or the application programs to access the controller so as to realize control or management of the system resources.

For example, various software modules stored in the memory 260 may include a base module, a detection module, a communication module, a display control module, a browser module, various service modules and the like. Herein, the base module is an underlying software module configured to process a signal received from each hardware element in the display device and transmitting the processed signal to the upper-layer application module. The detection module is a management module used for collecting various information from various detectors or user interfaces and performing digital-to-analog conversion and analysis management on the collected information. The communication module is a module configured to realize control and data communication with the external device. The display control module is a module used for controlling the display to display an image content and may be configured to play a multimedia image content and GUI interface information.

The browser module is a module used for accessing a web server by executing a web browsing operation. The service modules are modules configured to provide various services and application programs.

The user interface 265 receives various user interactions. Specifically, the user interface 265 is used for transmitting an input signal from the user to the controller 250 or transmitting the output signal from the controller 250 to the user. Exemplarily, the remote controller 100A is capable of transmitting the input signal such as a power switch signal, a channel selection signal and a volume regulation signal input by the user to the user interface 265 and then transmitting the input signal from the user interface 265 to the controller 250; or the remote controller 100A is capable of receiving the output signal such as an audio, a video or data processed by the controller 250 and output from the user interface 265 and displaying the received output signal or outputting the received output signal in an audio or vibration form.

In some embodiments, the user may input a user command on a graphic user interface (GUI) displayed on the display 275, and thus, the user interface 265 receives the user input command by the GUI. To be specific, the user interface 265 is capable of receiving the user input command used for controlling the position of the selector in the GUI so as to select different objects or items.

Alternatively, the user may input the user command by inputting a specific sound or gesture, and thus, the user interface 265 identifies the sound or gesture by the sensor so as to receive the user input command. The video processor 270 is configured to receive an external video signal and performing video data processing such as decompression, decoding, zooming, denoising, frame rate conversion, resolution ratio conversion and image synthesis according to a standard coding and decoding protocol of the input signal so as to obtain a video signal which may be directly displayed or played on the display 275.

In some examples, the video processor 270 includes a demultiplexing module, a video decoding module, an image synthesis module, a frame rate conversion module, a display formatting module and the like.

The demultiplexing module is configured to demultiplex an input audio/video data flow such as an input MPEG-2 flow (based on a compression standard of a motion image and voice of a digital storage media), and thus, the input audio/video data is demultiplexed by the demultiplexing module to form a video signal, an audio signal and the like.

The video decoding module is used for performing processing such as decoding and zooming on the demultiplexed video signal.

The image synthesis module such as an image synthesizer is used for performing superimposed mixing processing on a GUI signal generated by a graphic generator according to user input or the graphic generator and the zoomed video image so as to generate an image signal which may be displayed.

The frame rate conversion module is used for converting a frame rate of an input video, for example, a general format for converting the frame rate of an input 60 Hz video into a 120 Hz OR 240 Hz frame rate is realized in a way of frame interpolation.

The display formatting module is used for changing a signal output by the frame rate conversion module into a signal conforming to a display format of, for example, the display, for example, the signal output by the frame rate conversion module is going through format conversion so that an RGB data signal is output.

The display 275 is configured to receive the image signal input from the video processor 270 and displaying a video content, an image and a menu operation interface. The displayed video content may be from a video content in a broadcast signal received by the tuning demodulator 210 or a video content input from the communicator 220 or the external apparatus interface 240. The display 275 simultaneously displays a user operation interface UI generated in the display device 200 and used for controlling the display device 200.

In addition, the display 275 may include a display screen component used for presenting a picture and a driving component for driving an image. Or, when the display 275 is a projection display, the display 275 may further include a projection apparatus and a projection screen.

The audio processor 280 is configured to receive an external audio signal and perform audio data processing such as decompression and decoding as well as denoising, digital-to-analog conversion and amplification according to the standard coding and decoding protocol of the input signal so as to obtain an audio signal which may be played in a loudspeaker 286.

In some examples, the audio processor 280 is capable of processing various audio formats such as MPEG-2, MPEG-4, advanced audio coding (AAC), and high-efficiency AAC (HE-AAC).

The audio output interface 285 is configured to receive the audio signal output from the audio processor 280 under the control of the controller 250, and the audio output interface 285 may include the loudspeaker 286 or an external audio output terminal 287 such as an earphone output terminal for outputting to an external device.

In some other exemplary embodiments, the video processor 270 may include one or more chips. The audio processor 280 may also include one or more chips.

In addition, in some other exemplary embodiments, each of the video processor 270 and the audio processor 280 may comprise a single chip or may be integrated into the one or more chips together with the controller 250.

The power supply source 290 is configured to provide power supply support for the display device 200 by utilizing power input from an external power supply under the control of the controller 250. The power supply source 290 may be a built-in power supply circuit installed in the display device 200 or a power source installed outside the display device 200.

Figure 1D:
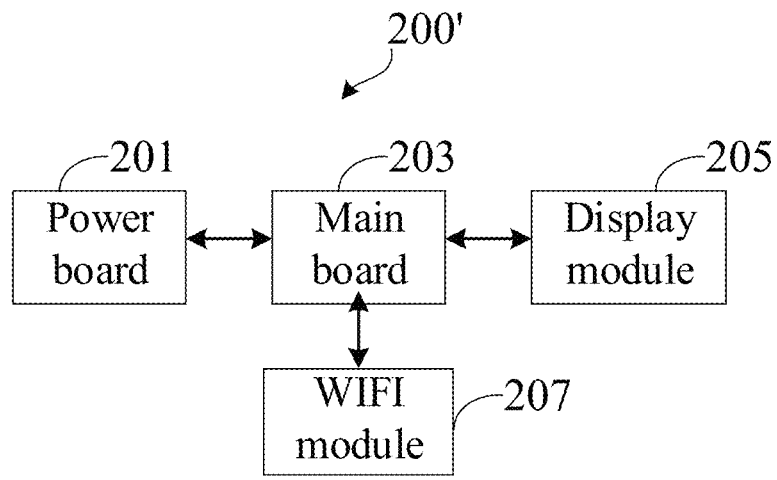
FIG. 1D illustrates the other configuration block diagram of the display device 200 in FIG. 1A.

FIG. 1D illustrates the other configuration block diagram of the display device 200. As shown in FIG. 1D, a display device 200 may include a power board 201, a main board 203, a display module 205 and a wireless module 207. The components may correspond to parts of components in FIG. 1C in some sense. In one implementation, the wireless module 207 may include a WiFi module.

The power board 201 is configured to provide a voltage for the components such as the main board 203, the display module 205 and the WIFI module 207. The power board 201 may correspond to the power supply source 290 in FIG. 1C.

The main board 203 is configured to process various signals in the display device. For example, the main board is configured for processing and responding to a control signal of the control apparatus 100; performing format conversion for a signal input from the external apparatus interface 240, such as a radio frequency signal input from the tuning demodulator 210, digital signals input from an HDMI 241 and a USB 244, and a component signal input from a component interface 243, so as to generate a identified signal such as a low-voltage differential signal (LVDS) which may be identified by the display 275; and outputting an audio signal input from the external apparatus interface 240 to the audio output interface 285 after being volume control and sound effect processing.

The main board 203 may include components such as the external apparatus interface 240, the controller 250, the video processor 270, the audio processor 280, the audio output interface 285 and the memory 260 in FIG. 1C as well as various integrated circuits, wherein the controller 250 on the main board 203 may be implemented as a system-on-chip (SOC) and a micro-control unit (MCU). In some examples, the SOC may be configured to inform the state that the display device enters the standby mode, the customized mode or the operating mode to the MCU, and the MCU is configured for processing state parameters in each mode.

The display module 205 is used for converting a signal output from the main board 203 into a driving signal which may be processed by the display so as to drive the display to display. The display module 205 may correspond to the display 275 in FIG. 1C and a logic board (not shown in FIG. 1C) for driving the display.

The WIFI module 207 is responsible for WIFI network function of the display device. For example, the WIFI module 207 is used as a transmission channel for communication between the display device and an external server or device; and the WIFI module 207 is capable of triggering the main board 203 to boot after receiving a WIFI wakeup signal transmitted by the mobile device 100B. The WIFI module 207 may correspond to a WIFI module 221 in FIG. 1C.

In an application scenario, the user may push the media file to the display device 200 through the mobile device 100B based on the configuration block diagrams of the control apparatus and the display device, so that the media file may be played through the display device.

It should be noted that, in the method for pushing the media file to the display device, provided by the application, the terminal for pushing the media file to the display device may be a non-mobile device such as a personal computer (PC) or the mobile device 100B, and there are no limits to the type of the terminals in the application.

Taking the mobile device 100B and the display device 200 as examples, in some embodiments, each of the mobile device 100B and the display device 200 is internally installed an application (the application is called media playing application in order to facilitate description in some embodiments as follows) associated with media playing, and the user may realize interactive communication with the display device 200 through the application in the mobile device 100B so as to perform media playing associated operations on the display device.

In some application scenes, the user may play a video program by live broadcast or on-demand broadcast through a media playing client side application associated with the display device and installed in the mobile device. In some implementations, the user transmits a media playing instruction to the display device through a client side application in the mobile device, the media playing instruction carries a URL (Uniform Resource Locator) of a video file, and a video stored in a network server is acquired by a server side application in the display device according to the URL of the video file in the instruction and is played. Herein, the URL of the video file may be various server addresses including in the video file.

In another application scene, the user may push a local media file (such as a video file, an image file and an audio file) stored in the mobile device to the display device to play the local media file. In some implementations, the user transmits the media playing instruction to the display device through the client application in the mobile device, the instruction carries the URL of the medial file and a media file obtained after the local media file of the mobile device is coded by using a digital coding technique, and the received media file is decoded and played by the display device according to the URL of the media file. Herein, the URL of the media file may be a local storage position or address of the media file on the mobile device.

In some applications, the interaction process between the mobile device and the display device may be performed when the display device is in the operating mode. When the display device is in the standby mode, the user may need to wake up the display device in the standby mode by the power key on the remote controller to ensure that the display device enters the operating mode from the standby mode, so that interactive communication with the mobile device may be performed after the service for interacting with the mobile device in the display device is started. In such a case, it may need relatively long boot time, increasing delay for the display device to restore to the operating mode, and therefore, the experience of the user is relatively poor.

To solve at least the above problem associated with conventional applications, some embodiments of the disclosure provide a media file processing method for a display device, a "customized" mode is introduced for the display device, and the service for interacting with the mobile device in the display device is started in the mode. Firstly, the display device is wakened from a standby mode to the customized mode after a wakeup signal transmitted from the mobile device is received, in this way, the display device has been wakened at the moment after the mobile device transmits a media playing instruction to the display device in the customized mode, and therefore, the instruction may be rapidly responded to play a media file.

The media file processing method for the display device, according to some embodiments of the disclosure, includes:

while the display device is in a standby mode, receiving a wakeup signal broadcasting from a mobile device by a wireless module in the display device and triggering the display device to execute a customized mode where the display device is booted but a screen of the display device is not lighted by an electrical level according to the wakeup signal, wherein the display device in the customized mode is able to be found by the mobile device so that communication between the display device and the mobile device is able to be performed;

while the display device is in the customized mode, receiving a media file push instruction from the mobile device associated with the display device, lighting the screen of the display device, and playing a media file according to the media file push instruction so as to make the display device enter a normal operating mode. In one implementation, the wireless module may include a WiFi module.

In some implementations, playing the media file according to the media file push instruction includes: based on a media source address contained in the media file push instruction, acquiring an online media file from a network server corresponding to the media file source address, and playing the online media file.

In some implementations, playing the media file according to the media file push instruction includes: according to an address for accessing local media file in the mobile device contained in the media file push instruction, acquiring a local media file from the mobile device corresponding to the address for accessing local media file, and playing the local media file.

In some implementations, the method according to some embodiments of the disclosure further includes:

upon the display device entering into the customized mode, causing the display device start monitor service so as to monitor the media file push instruction sent from the mobile device associated with the display device.

In some implementations, the monitor service is shut down after the display device receives the media file push instruction sent from the mobile device associated with the display device.

In some implementations, the method further comprises: when the display device is in the customized mode, determining whether the media file push instruction transmitted by the mobile device associated with the display device is received or not within a predetermined period in response to not receiving the media file push instruction within the predetermined period, causing the display device enter the standby mode, and keeping the WiFi module power up in the standby mode.

In some implementations, the display device is set to be in audio mute when the display device enters the customized mode.

In some implementations, the audio mute of the display device is cancelled after the display device receives the media file push instruction.

In some implementations, the media file is directly played according to the media file push instruction, rather than playing a boot animation after the screen of the display device is lighted.

Accordingly, some embodiments of the disclosure further provide a display device including a WiFi module, a processor, a memory and a display screen;

the WiFi module is configured to receive a wakeup signal broadcasting by a mobile device;

the memory is configured to store computer instructions and data associated with the display screen;

the display screen is configured to display image data;

the processor is configured to execute the computer instructions to cause that the display device to:

while the display device is in a standby mode, receive the wakeup signal sent from the mobile device by the WiFi module in the display device, and trigger the display device to enter into a customized mode where the display device is started without lighting a screen of the display device by an electrical level based on the wakeup signal, wherein the display device in the customized mode is able to be found by the mobile device to enable the communication between the display device and the mobile device; and while the display device is in the customized mode, receive a media file push instruction sent from the mobile device associated with the display device, light the screen of the display device and play a media file according to the media file push instruction so as to cause the display device enter a normal operating mode.

In some implementations, playing the media file according to the media file push instruction is performed by:

according to a media file source address contained in the media file push instruction, acquiring an online media file from a network server corresponding to the media file source address, and playing the online media file.

In some implementations, playing the media file according to the media file push instruction is performed by:

according to a mobile device local media file address contained in the media file push instruction, acquiring a local media file from the mobile device, and playing the local media file.

In some implementations, the processor is further configured to execute the computer instructions to cause the display device to:

upon entering into the customized mode, start a monitor service so as to monitor the media file push instruction sent from a terminal associated with the display device.

In some implementations, the processor is further configured to execute the computer instructions to cause the display device to:

after receiving the media file push instruction sent from the mobile device associated with the display device, shut down the monitor service.

In some implementations, the processor is further configured to execute the computer instructions to cause the display device to:

while the display device is in the customized mode, determine whether the media file push instruction sent from the mobile device associated with the display device is received or not within a predetermined period, in response to not receiving the media file push instruction within the predetermined period, cause the display device enter into the standby mode, and keep the WiFi module power up in the standby mode.

In some implementations, the processor is further configured to execute the computer instructions to cause the display device to:

setting the display device to be in audio mute upon the display device entering into the customized mode.

In some implementations, the processor is further configured to execute the computer instructions to cause the display device to:

cancelling the audio mute upon receiving the media file push instruction sent from the mobile device associated with the display device.

In some implementations, the processor is further configured to execute the computer instructions to cause the display device to:

upon lighting the screen of the display device, directly playing the media file according to the media file push instruction, without playing a boot animation.

Figure 2:
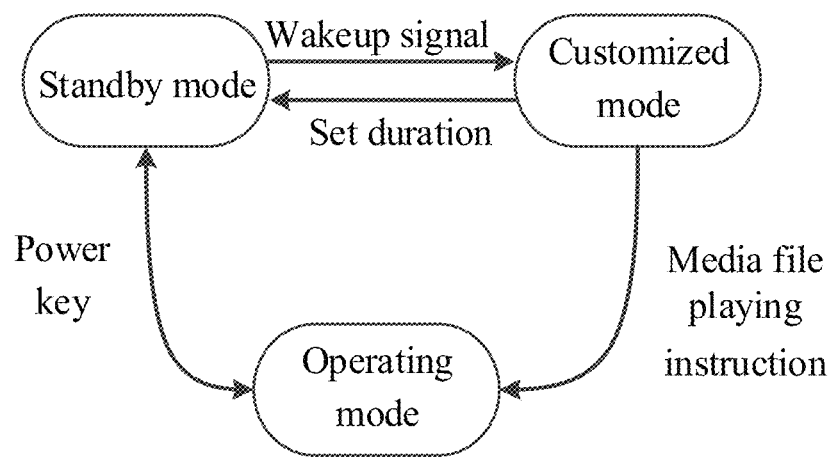
FIG. 2 is a schematic diagram of mode transition of the display device according to some embodiments of the disclosure.

FIG. 2 is a schematic diagram of mode transition of the display device according to some embodiments of the disclosure.

As shown in FIG. 2, in some embodiments of the disclosure, the display device has three modes: a standby mode, a customized mode and an operating mode, and the three modes may be switched under certain conditions.

In the standby mode, the WiFi module in the display device is in powered up state, namely an on state, may receive the wakeup signal based on a WiFi protocol and may be wakened by the wakeup signal to trigger boot so as to cause the display device enter into the customized mode. Some components of the display device associated with media output functions in the standby mode are shut down, for example, the screen of the display device is in a non-lighted state, and the audio output of the display device is in a mute state.

Most or all of system service in the display device in the standby mode is in the off state.

In some implementations, the network service is started, the network service is used for making the display device establish connection with the mobile device; in this way, the network service needs to be reconnected after the display device enters the customized mode, and the time delay caused by reconnection of the network service is avoided, so that the speed for playing the media file pushed from the mobile device to the display device is increased.

In some implementations, media file playing service is started, in this way, the time delay for restoring the media file playing service is avoided after the display device enters into the customized mode, so that the mobile device may rapidly find the display device in the network.

Herein, the media file playing service includes online media file playing service and local media file playing service. The online media file playing service such as Wechat television application correlated service is configured to acquire the online media file from the network server corresponding to the media file source address according to the media file source address contained in the media file push instruction and playing the online media file after the display device receives the media file push instruction from the mobile device correlated to the display device. The local medial file playing service such as media center application correlated service is configured to acquire the local media file from the mobile device according to the mobile device local media file address contained in the media file push instruction and playing the local media file after the display device receives the media file push instruction sent from the mobile device associated with the display device.

In the customized mode, parts of system service in the display device are started. The started system service at least includes monitor service, and the monitor service is used for making the display device monitor a media file playing instruction sent from the mobile device associated with the display device.

In some implementations, the screen of the display device in the customized mode is in the non-lighted state, and the audio output is in the mute state. Thus, the experience that the performance of the display device in the customized mode and the standby mode is consistent may be created for the user.

In the operating mode, the display device is able to work normally, for example, the display device is capable of interacting with the mobile device and responding the media file playing instruction from the mobile device. For the display device in the operating mode, the audio output is in the on state, and the screen is in a lighted state.

The three modes of the display device may be switched under the following conditions.

The display device in the operating mode is switched to the standby mode when the user operates a power key on a remote controller or operates a power key on a backboard of a television or issues a "turn off" command by voice control.

The display device in the standby mode is switched to the operating mode when the user operates the power key on the remote controller or operates the power key on the backboard of the television or issues a "turn on" command by voice control.

The display device in the standby mode is switched to the customized mode from the standby mode upon receiving the wakeup signal, wherein the mobile device broadcasts the wakeup signal when the user starts the client side application associated with the display device and installed on the mobile device or the mobile device and the display device are added into the same network, so that the display device in the standby mode is able to receive the wakeup signal and be wakened by the wakeup signal so as to enter the customized mode.

The display device in the customized mode is switched to the operating mode when the user transmits the media file playing instruction to the display device by operating the client side application associated with the display device and installed on the mobile device or operates the power key on the remote controller or operates the power key on the backboard of the television or issues voice commands.

The display device in the customized mode is switched to the standby mode when the user does not perform further operation within the preset time period (such as 60 s), for example, the media file playing instruction from the mobile device is not received, so that the power consumption is reduced.

In a process from the standby mode to the customized mode, the display device suspends to an RAM (STR) to rapidly boot, and parts of services are started in the process, wherein the parts of service at least include the monitor service, and the monitor service is used for making the display device monitor the media file playing instruction from the mobile device associated with the display device.

In some implementations, the started services at least further include an online media file playing service and a local media file playing service, wherein the online media file playing service is configured to play the online media file according to the media file playing instruction after the display device monitors the media file playing instruction from the mobile device associated with the display device; and the local media file playing service is configured to acquire the local media file of the mobile device by interacting with the mobile device according to the media file playing instruction and decoding and playing the local media file after the display device monitors the media file playing instruction sent from the mobile device associated with the display device.

In some implementations, during the process from the standby mode to the customized mode, the display device keeps the audio output in a mute state, and the screen is switched from a non-power-up state to a power-up state, but the backlight of the screen is kept turned off. During a process from the customized mode to the operating mode, the display device cancels audio mute and turns on the backlight of the screen to light the screen, so that the played media file is shown.

It is noted that the non-lighted state of the screen may be realized in two ways: the screen is not in power-up state, and the screen is in power-up state but keeping the backlight of the screen off. In a scenario where the screen is power-off, if the screen is required to be lighted, it is needed to power up the screen and then turn on the backlight of the screen, which may require a relatively longer time to light the screen and present the display interface. In a scenario where the screen is in power-up state but keeping the backlight off, if the screen is required to be lighted, it is just needed to turn on the backlight, which only needs a relatively shorter time to light the screen and present the display interface. In the customized mode where the screen is not lighted which is realized by keeping the screen power up and the backlight off, as a result, when the display device switches from the customized mode to the operating mode, the screen is able to be lighted quickly by directly turning on the backlight of the screen, therefore improving user's experience.

In some implementations, in the process from the standby mode to the customized mode, the display device may also turn off boot animation service, on the one hand, the wakeup time delay of the display device may be shortened, on the other hand, after the display device receives the media file playing instruction sent from the mobile device, the media file may be directly played, the user does not have to wait for the display device to finish playing the boot animation, the media play interface is able to be presented once the play instruction is received.

The display device in the customized mode enters into the operating mode and performs media playing after receiving the media file playing instruction sent from the mobile device associated with the display device, wherein when the media file playing instruction is configured to indicate playing a media file stored at a network side, the display device acquires the media file from the network side according to a URL of the media file carried in the media file playing instruction and plays the media file; and when the media file playing instruction is configured to indicate playing a media file sent from the mobile device, the display device receives the local media file of the mobile device sent by the mobile device and plays the received media file after decoding the received media file.

In some implementations, after the display device receives the media file playing instruction, firstly, the display device may switch to a signal source corresponding to a media file playing and play the media file; and then, the screen is lighted, and the display device is forbidden to switch to the signal source before the standby state. The transition of the signal source may be generally triggered when the screen is lighted so that the signal source is transitioned to the signal source before standby, however, in some embodiments of the disclosure, the signal source is forbidden to be transitioned to the signal source before standby when the screen is lighted, so that the signal source corresponding to the media file requested to be played is prevented from being transitioned, and furthermore, the playing of the media file is guaranteed. In addition, the signal source is transitioned to the signal source corresponding to the media file requested to be played when the screen is lighted, so that the media file is played, in this way, the user may immediately see the played media file after the screen is lighted, and furthermore, the experience of the user is improved.

In some implementations, the monitor service may also be shut down after the display device receives the media file push instruction transmitted from the mobile device. At the moment, the display device has entered the operating mode and established communication connection with the mobile device so as to be capable of realizing communication with the mobile device by communication connection without receiving the media file playing instruction transmitted from the mobile device in a monitoring mode.

In some implementations, the network service of the display device in the standby mode may be in an on state, and thus, the display device transmits a corresponding signal to the mobile device transmitting the wakeup signal based on the network service after receiving the wakeup signal, and the corresponding signal carries relevant information of the display device. The mobile device is able to establish connection with the display device after receiving the corresponding signal, wherein the relevant information of the display device may include name and a media access control (MAC) address including a wired MAC address, a wireless MAC address and the like of the display device. Information such as a connected network name (service set identifier (SSID)), the MAC address of the display device and a television name are stored as one record to be stored after the mobile device is correlated to the display device. In one implementation, the wireless MAC address may include a WiFi MAC address.

In some embodiments of the disclosure, on the one hand, firstly, the display device in the standby mode is wakened in advance by the wakeup signal broadcast by the terminal so as to enter the customized mode, wherein the display device in the customized mode may be found by the terminal so that the display device and the mobile device are correlated; and next, when the user performs an operation of pushing the media file on the terminal, the display device in the customized mode is capable of receiving a pushing operation instruction and is automatically triggered to enter the operating mode and play the media file, so that the pushed media file is played by the display device in the standby mode. On the other hand, the screen of the display device in the customized mode is controlled to be in the non-lighted state, while the screen of the display device in the operating mode is controlled to be in the lighted state, so that the visual experience of pushing the media file to the display device in the standby mode is provided for the user.

Further, there is no need to do like the prior art "the display device in the standby mode is wakened by the power key firstly, and then, the media file is pushed to the display device and is played", so that the display device in the standby mode is wakened in advance by the wakeup signal broadcast by the terminal so as to enter the customized mode, and the display device in the customized mode is capable of receiving the pushing operation of the media file from the terminal in the example, not only may the visual experience of non-inductively pushing the media file to be played in the standby mode be provided for the user, but also the time delay from the standby mode to the media file playing may be shortened.

Some embodiments of the disclosure may be realized based on an operation system of the display device.

Figure 3:
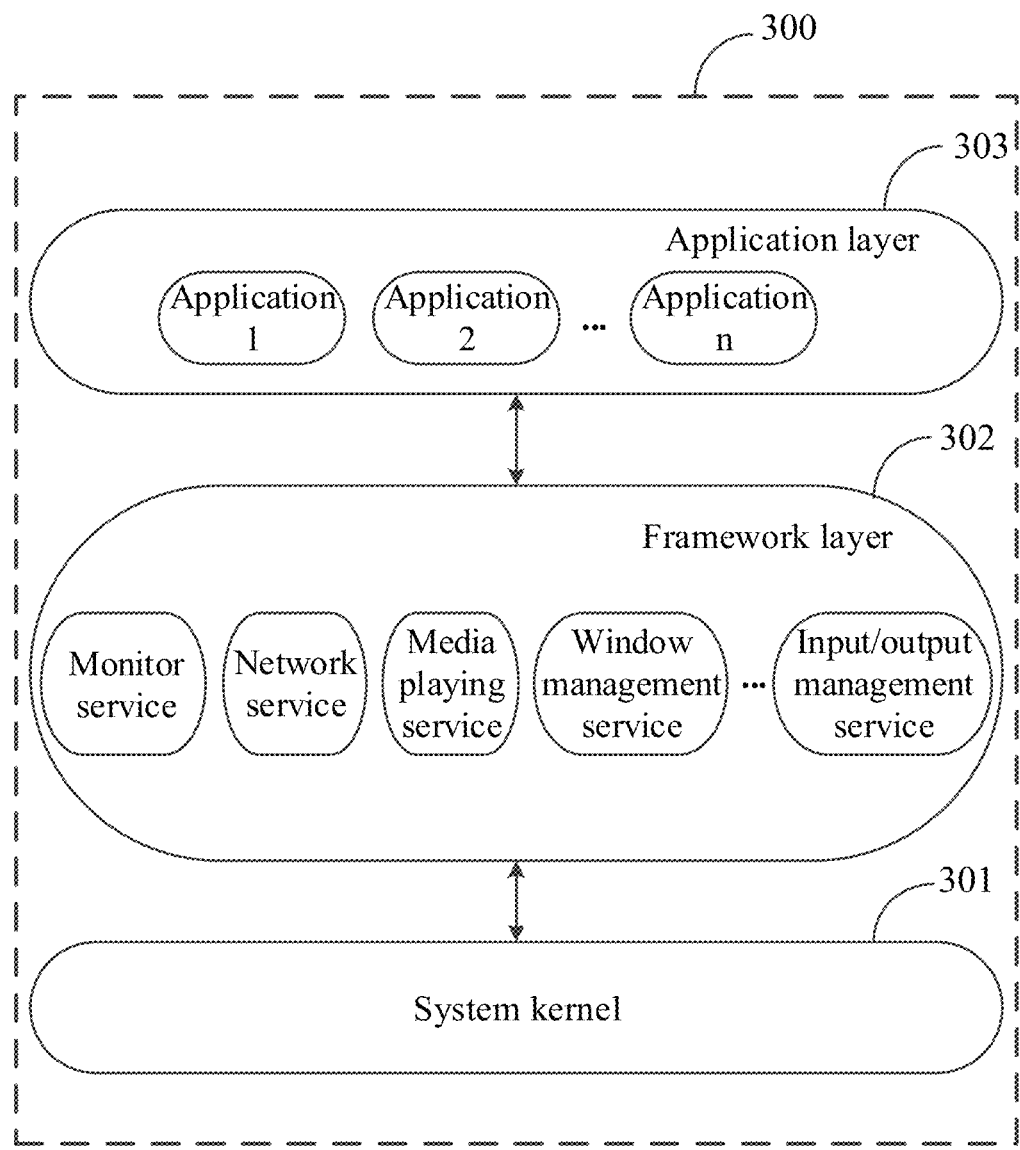
FIG. 3 is a structural schematic diagram of an operation system of the display device according to some embodiments of the disclosure.

FIG. 3 is a structural schematic diagram of the operation system in the display device according to some embodiments of the disclosure.

As shown in FIG. 3, the operation system 300 may be divided into a system kernel 301, a framework layer 302 and an application layer 303 from a bottom layer to a high layer.

The system kernel 301 is configured to provide core system service such as bootstrap, file management, memory management, progress management and network management for the display device. The system kernel 301 includes programs such as an input/output device driver, a wireless module driver, and a power management module driver so as to drive hardware in the display device. In one implementation, the wireless module driver may include a WiFi module driver.

The framework layer 302 is configured to provide an application programming interface (API) for various services required by the application layer. The various services may be a monitor service, a network service, a media playing service, a boot animation service and the like mentioned in some embodiments of the disclosure as well as a window management service, an input/output management service and the like.

The application layer 303 is configured to directly interact with the user. The application layer 303 includes various applications such as a setting center application used for setting system property, a boot animation application configured to process the playing of the boot animation of the display device and a media playing server side application capable of cooperating with the mobile device to realize a media playing function.

In some embodiments of the disclosure, the system kernel 301 is configured to receive the wakeup signal broadcast by the mobile device and transmitting the wakeup signal to the framework layer 302.

The framework layer 302 is configured to wake the display device in the standby mode according to the wakeup signal so that the display device in the standby mode is wakened to enter the customized mode; wherein some of services in the display device in the customized mode are started, these services at least include the monitor service, and the monitor service is used for making the display device monitor the media file playing instruction transmitted from the mobile device associated with the display device.

The system kernel 301 is further configured to receive the media file playing instruction sent from the mobile device associated with the display device and transmit the media file playing instruction to the framework layer 302.

The framework layer 302 is further configured to monitor the media file playing instruction, so that the display device in the customized mode enters the operating mode, and the application in the application layer 303 is triggered to perform media playing according to the media file playing instruction.

Based on the system architecture in FIG. 1A and the operation system in FIG. 3, the user may realize the transition of the display device from the operating mode to the standby mode, from the standby mode to the customized mode, from the customized mode to the operating mode, from the customized mode to the standby mode and from the standby mode to the operating mode in some embodiments of the disclosure.

The implementation process of some embodiments of the disclosure is described below in combination with the operation system 300 as well as FIG. 4 to FIG. 8.

Relevant terms appearing in the operation system in FIG. 4 to FIG. 8 are firstly described below.

Settings refer to a setting center of the display device and is configured to modify parameters in system property and parameters in a driving environment.

Flow API refers to an transmission control interface which is a functional control interface of the display device and is configured to realize top-to-bottom control from the application layer to a native layer.

Middleware refers to middleware of the display device, which belongs to a system service, is configured to interact with the application programs and is further configured to drive a hardware device.

System Property refers to the system property of the display device, which is configured to acquire system property parameters of the display device.

Environment refers to a driving environment of the display device, which is configured to acquire parameters of a bottom layer driver of the display device.

Kernel refers to a system kernel.

Framework refers to a framework, namely the framework layer of the operation system.

STR Service refers to an STR service which is configured to realize STR standby and boot.

Init refers to an initial process, namely a process started first during the system initialization, which has ROOT access.

Network refers to a network service which is a system service.

PM is short for Power Manager, namely a power management module which is a system service used for power management of the display device.

SBOOT refers to a guiding module which is a system service and is configured to guide the boot of the display device.

MI is short for Master Interface, namely a master interface.

BootAnimation refers to a boot animation which is a system service and is configured to show a brand logo, advertisements and the like in a boot process.

MediaCenter refers to a media center of the display device, which includes an online media file playing service configured to play an online media file and a local media file playing service configured to play a local media file and is configured to acquire a media file resource and determining a media file format and the like.

Tile Transition refers to a media transition service of the display device, which is used for switch of signal sources; the signal sources include physical signal source inputs such as a digital television (DTV), an analog television (ATV) and a high definition multimedia interface (HDMI), and every kind of signal source correspond to one of different decoders and resources, and therefore, the signal source transition service is required to switch the signal sources to corresponding playing interfaces to perform media playing.

WindowManager refers to a window management module of the display device, which is used for calling the STR Service.

Figure 4:
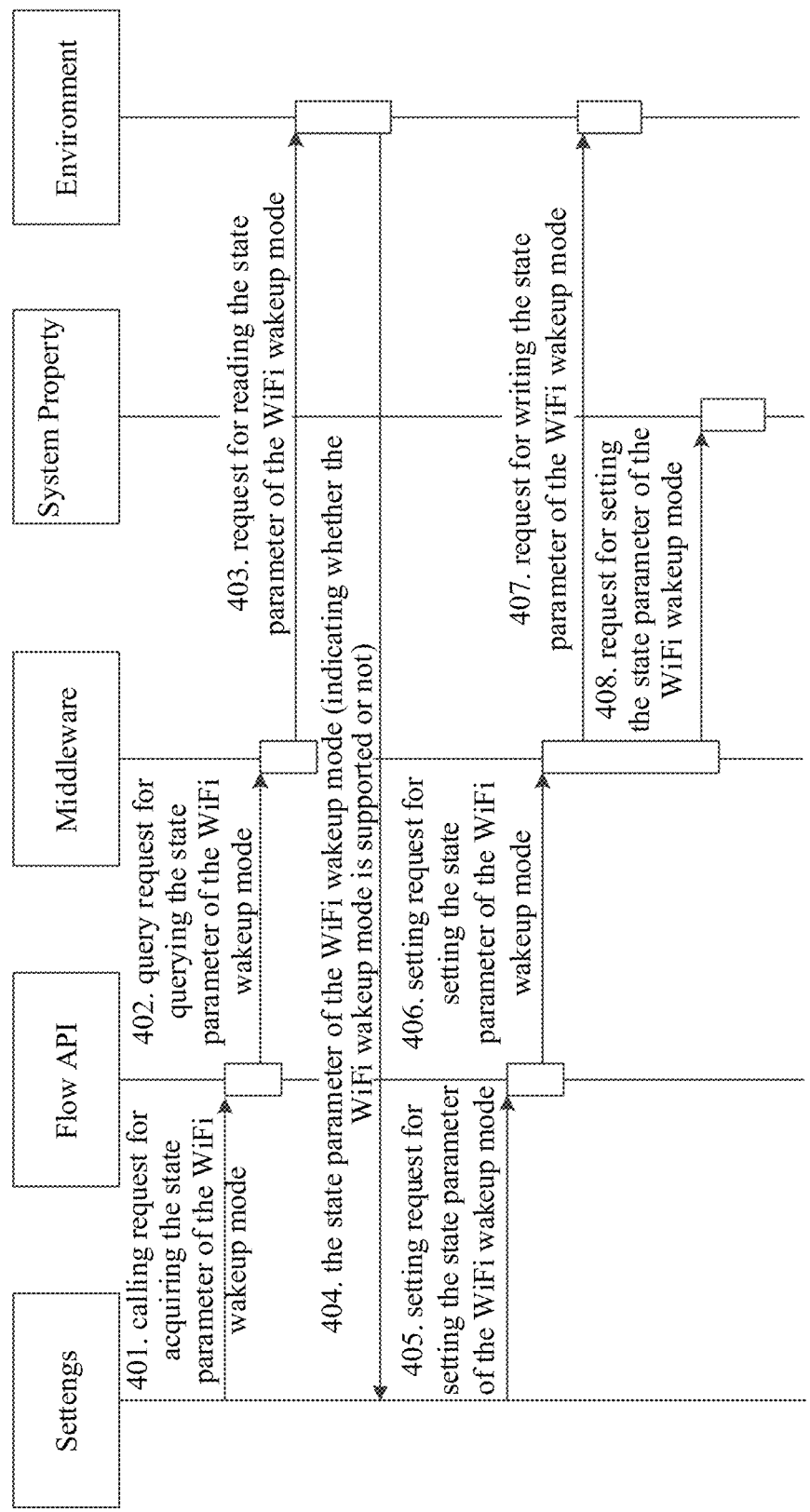
FIG. 4 is a flow diagram of a state of setting a WiFi wakeup mode according to some embodiments of the disclosure.

FIG. 4 is a flow diagram of a state of setting a wireless wakeup mode according to some embodiments of the disclosure. In one implementation, the wireless wakeup mode may include a WiFi wakeup mode.

As shown in FIG. 4, the on/off control process is used for controlling the WiFi wakeup mode of the display device to be in an on or off state, the WiFi wakeup mode may be shut down by the process as shown in FIG. 4 when the user does not use the WiFi wakeup mode in the display device for a long time, and thus, the consumption of the WiFi wakeup mode in the standby mode may be reduced. As shown in the figure, the process includes:

S401-S404: Settings determines whether the driving environment of the display device supports the WiFi wakeup mode or not by the Flow API and the Middleware.

In S404, the driving environment reads parameters information of the bottom layer driver to determine that the display device supports the WiFi wakeup mode and returns information (such as a state parameter of the WiFi wakeup mode in the figure) for indicating whether the WiFi wakeup mode can be enabled or not to the Settings.

S405-S408: after the Settings determines that the driving environment supports the WiFi wakeup mode, by means of the Flow API and the Middleware, on the one hand, indication information configured to describe the state of the WiFi wakeup mode is written into the parameters of the driving environment, and on the other hand, the indication information configured to describe the state of the WiFi wakeup mode is written into the parameters of the system property.

The state of the WiFi wakeup mode comprises that the WiFi wakeup mode of the display device is in the on or off state; and in some implementations, the user may turn off or turn on the WiFi wakeup mode in the display device as required, furthermore, the Settings is triggered, and therefore, on the one hand, the indication information configured to describe the state of the WiFi wakeup mode is written into the parameters of the driving environment to provide basis information of determination for the MI module, and on the other hand, the indication information configured to describe the state of the WiFi wakeup mode is written into the parameters of the parameters of the system property to provide basis information of determination for the Middleware.

Based on the process as shown in FIG. 4, in an application scenario, when the user opens a WiFi wakeup mode setting interface by the remote controller, the display device acquires the current state parameter (the parameter is configured to indicate whether the WiFi wakeup mode is supported or not) of the WiFi wakeup mode through S401-S404 and displays the parameter in the interface, for example, the current state parameter of the WiFi wakeup mode indicates that the WiFi wakeup mode is supported. A switch key used for turning off/turning on the mode may also present in the interface. When the user selects to turn off the WiFi wakeup mode by the remote controller, the display device updates the value of the state parameter of the WiFi wakeup mode through S405-S408 and stores the updated parameter.

Figure 5:
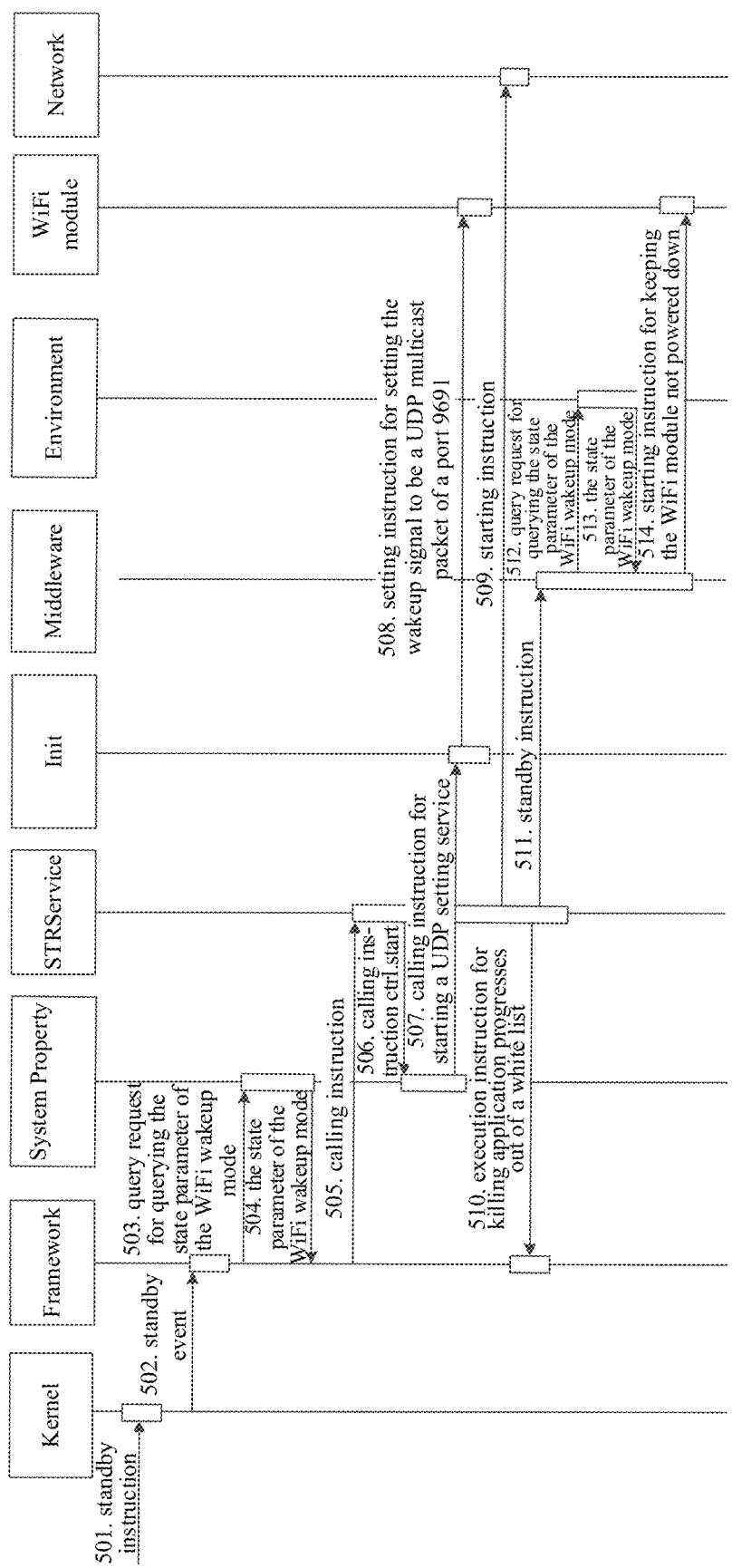
FIG. 5 is a flow diagram that the display device enters a standby mode from an operating mode according to some embodiments of the disclosure.

FIG. 5 is a flow diagram illustrating the display device entering into the standby mode from the operating mode according to some embodiments of the disclosure.

As shown in FIG. 5, the display device in the operating mode enters the standby mode when the user operates the power key on the remote controller, or operates the power key on the backboard of the television or give turn off command by voice control. As shown in the figure, the process includes:

S501: the kernel process receives a standby instruction.

The standby instruction may be sent by operating the power key on the remote controller by a user or operating the power key on the backboard of the television or giving turn off command by voice control.

S502: upon receiving the standby instruction, the kernel process generates a standby event and transmits it to the framework.

S503-S505: the framework receives the standby event, finds the system property, determines whether to start the WiFi wakeup mode or not according to the system property (for example, the state parameter of the WiFi wakeup mode is configured to indicate whether the WiFi wakeup mode can be enabled or not), if it is determined to start the WiFi wakeup mode, the STR Service (used for logic processing of relevant functions of rapid standby and boot of an STR) is called, and a standby process supporting the WiFi wakeup mode is started.

In the step, the standby process (S506-S514) may be started by calling the API of the STR Service.

S506-S508: the STR Service transmits a setting command to the WiFi module through an Init process, and the setting command is used for making the WiFi module support the WiFi wakeup mode.

The WiFi module supports command control, while the root property is required when a command is set for the WiFi module, therefore, in S506, the STR Service calls the init process with the root access by using a property mechanism (such as ctrl.start) in the system property, the command is set for the WiFi module, furthermore, the WiFi module supports the WiFi wakeup mode, the WiFi module with the WiFi wakeup mode is capable of monitoring the wakeup signal. Specifically, the wakeup signal includes a datagram protocol (for example, User Datagram Protocol, UDP) multicast packets, such as a Magic Packet and an mDNS (Multicast Domain Name System) packet.

In some implementations, the setting command is configured to inform the formats of the wakeup signal of the WiFi module in the WiFi wakeup mode and port numbers for receiving the wakeup signal, for example, the wakeup signal is transmitted by UDP, and the port number for receiving the wakeup signal is 9691. When the WiFi module of the display device in the standby mode receives the wakeup signal by UDP through the port 9691 (namely the UDP multicast packet of the port 9691), the wakeup mode is determined to be the WiFi wakeup mode, and the process (namely a transition process from the standby mode to the customized mode) based on the WiFi wakeup mode is performed.

S509: STR Service instructs the Network to keep the on state so as to keep the network service of the display device in the standby mode not shut down.

S510: STR Service instructs the framework to kill application processes except applications in a white list.

In some implementations, the white list includes services which are needed for interactions with the mobile device and media playing, such as an online media playing service and a local media playing service which are configured to acquire media resources for media playing.

In some implementations, in order to alleviate the delay in operation restarted after power off due to long-term standby of the system, background applications and services irrelevant to the WiFi wakeup mode may be shut down to optimize the system of the display device in S510.

S511-S514: the STR Service transmits a starting instruction to the WiFi module, the starting instruction is used for keeping the WiFi module not powered off, such that the WiFi module of the display device in the standby mode is able to receive the wakeup signal broadcast from the mobile device.

In an application scenario, the STR Service informs the Middleware to enter the standby state, the Middleware determines that the display device starts the WiFi wakeup mode according to the configured system environment parameters, so that the starting instruction is transmitted to the WiFi module, and furthermore, the WiFi module keeps the on state.

Further, the Middleware determines that functions such as a Bluetooth function and audio output are required to be shut down according to the system environment parameters, and therefore, the external devices such as the Bluetooth function and the audio output are shut down.

In some implementations, in S512-S513, if the Middleware determines that the display device has shut down the WiFi wakeup mode according to the configured system environment parameters, the WiFi module is shut down.

In the standby mode, the network service in the display device is kept on, and therefore, the display device is capable of transmitting a corresponding signal to the mobile device transmitting the wakeup signal after receiving the wakeup signal. The corresponding signal carries information such as an IP address of the display device, an MAC address and name of the display device. The mobile device establishes connection with the display device after receiving the corresponding signal.

Figure 6:
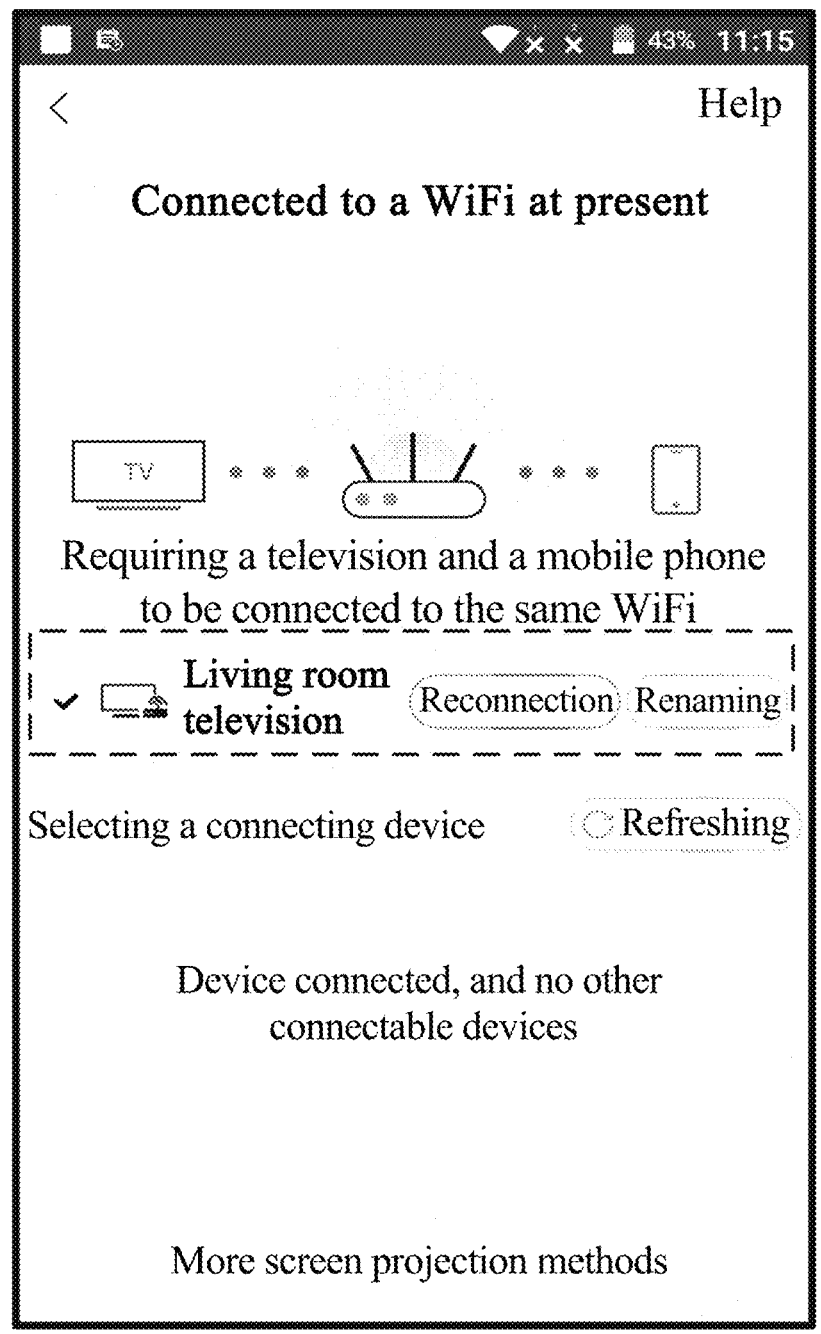
FIG. 6 is a schematic diagram of an interface where the display device is related to a mobile device in some embodiments of the disclosure.

In an example where the mobile device is a smartphone and the display device is a smart television, when a user starts a client side application associated with the smart television which is installed on the smart smartphone or the smartphone and the smart television are in the same wireless local area network, the smart smartphone broadcasts a wakeup signal in the wireless local area network, the smart television in the standby mode transmits a corresponding signal to the smartphone after receiving the wakeup signal, and the smartphone establishes connection with the smart television after receiving the corresponding signal; or an interface as shown in FIG. 6 is popped, the user may select a "living room television" as required to establish connection with the living room television. If there are other smart televisions in the wireless local area network, the plurality of smart televisions may transmit corresponding signals to the smartphone after receiving the wakeup signal broadcast by the smartphone, thus, the smartphone may receive the corresponding signals transmitting from the plurality of smart televisions, and information of the plurality of smart televisions is displayed in a user interface of the smartphone so as to make connection with one or more of the smart televisions selected by the user.

Figure 7:
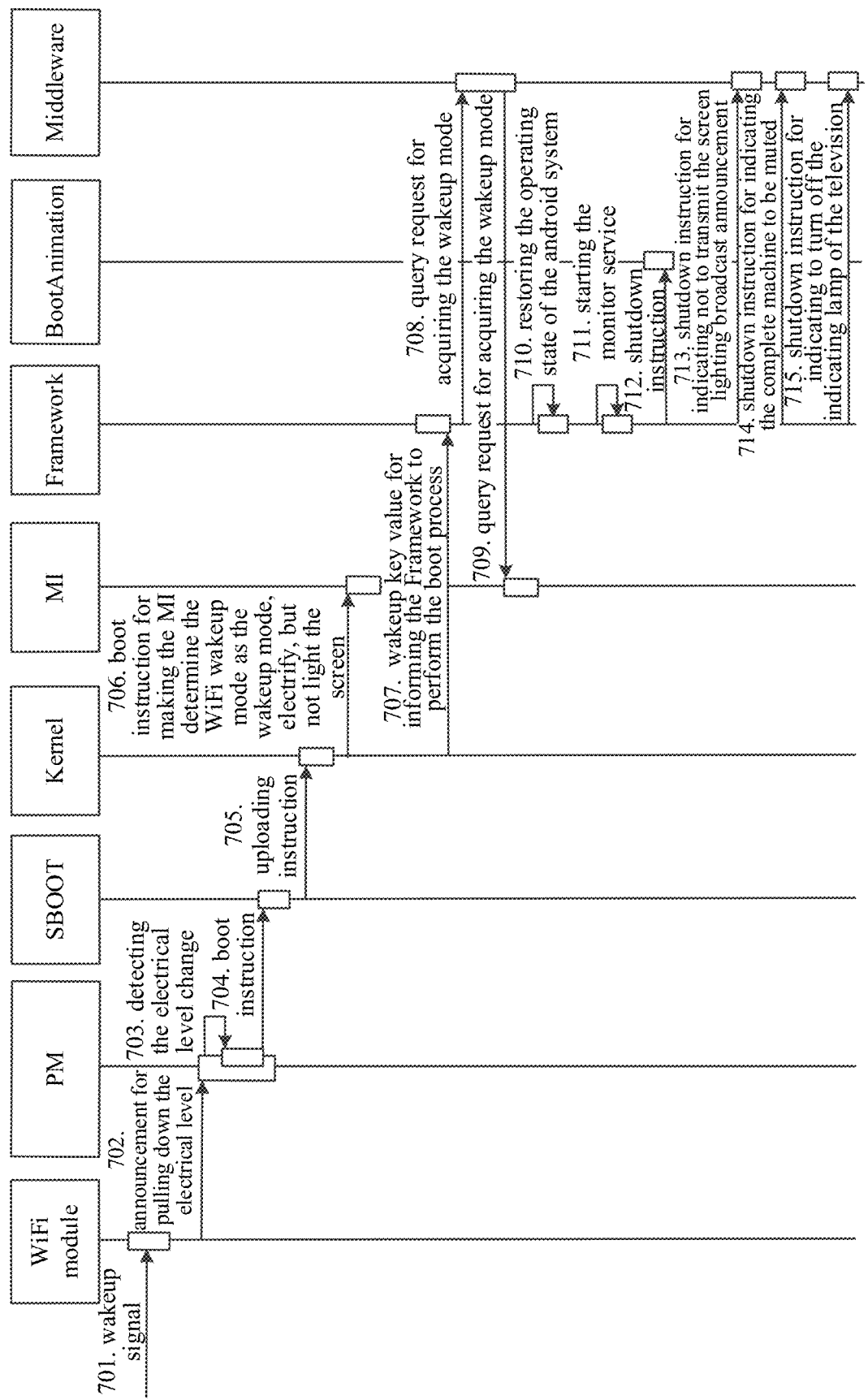
FIG. 7 is a flow diagram that the display device enters a customized mode from the standby mode according to some embodiments of the disclosure.

FIG. 7 is a flow diagram illustrating the display device entering into the customized mode from the standby mode according to some embodiments of the disclosure.

As shown in FIG. 7, the display device in the standby mode enters the customized mode when the user starts the client side application associated with the display device which is installed on the mobile device or the mobile device and the display device are in the same network. As shown in the figure, the process includes:

S701: the WiFi module receives a wakeup signal broadcasted from the mobile device.

In an application scenario where the mobile device is a smartphone, when a user starts a client side application (for example JUHAOKAN application) associated with the display device which is installed on the smart smartphone, the smart smartphone broadcasts a wakeup signal through a wireless local area network, when the client side application is running in the front-end, the wakeup signal is broadcast once according to a preset duration such as every 10 s. Specifically, the wakeup signal is the UDP multicast packet of the port 9691. Thus, when the user starts the client side application associated with the display device, it indicates that the user intends to push a media file to the display device, the wakeup signal may be periodically transmitted to wake up the display device in the standby mode in advance, so that it is convenient for the display device in the standby mode to receive the pushing operation. Or, when the smartphone and the display device are in the same wireless local area network, the smartphone broadcasts the wakeup signal through the wireless local area network, the wakeup signal is broadcast once according to the preset duration such as every 20 s. Specifically, the wakeup signal is the UDP multicast packet of the port 9691. Thus, the wakeup signal is also periodically transmitted to wake up the display device in the standby mode in advance, so that it is convenient for the display device in the standby mode to receive the pushing operation.

The WiFi module of the display device in the standby mode is not powered off, so that the wakeup signal may be received, and furthermore, the display device in the standby mode is wakened to enter the customized mode.

S702: upon receiving the wakeup signal, the WiFi module instructs to pull down a level of a universal output/input interface connected with a PM to trigger a level change.

Specifically, the wakeup signal is based on UDP and carries indication information from the client side application which is installed on the mobile device. In the standby mode, a universal serial bus (USB) controller of the WiFi module is connected with a USB controller of the main board, the WiFi module is identified to be in the WiFi wakeup mode when receiving the wakeup signal, so that the electrical level of the universal output/input interface connected with the PM is pulled down to trigger the electrical level change.

S703-S705: after the PM detects the electrical level change, the SBOOT triggers the uploading of the Kernel progress, so that a boot process is started.

S706-S707: the Kernel progress transmits a start instruction to the MI and transmits a wakeup key value to the Framework. The start instruction is configured to indicate the MI to determine whether the wakeup mode is the WiFi wakeup mode or not, and if yes, the screen is power on, but is not lighted; and the wakeup key value is configured to inform the Framework to perform the boot process.

After the MI module receives the start instruction, the wakeup mode is determined to be the WiFi wakeup mode, then, the screen is powered on, but is not lighted, and the display device is recorded to enter the customized mode by setting the system property, namely sys.wifi.fake_standby-.mode, to be true.

The above wakeup mode is directed to how the display device is triggered from the standby mode to the operating mode or customized mode, including operating a remote controller key (power key) to wake up, pressing a television backboard key to wake up, the WiFi wakeup mode, a voice wakeup mode and the like.

S708-S709: after the Framework receives the wakeup key value, it is determined the wakeup mode is the WiFi wakeup mode through the Middleware and the MI module.

Specifically, after the Framework receives the boot instruction, the wakeup mode is determined as the WiFi wakeup mode through the Middleware and the MI module, and furthermore, a customized process is performed.

S710-S715: after the Framework determines the WiFi wakeup mode as the wakeup mode, the monitor service is started, the boot animation playing service (Boot Animation) is shut down, the Middleware is instructed not to transmit a screen lighting broadcast notifications, to mute audio and turn off the power indicator of the display device.

Specifically, after the Middleware receives the instruction, screen lighting broadcast notifications configured to trigger other applications and services are not transmitted, a mute interface is called to keep the device in the mute state, the power indicator of the display device is turned off, and furthermore, the display device enters the customized mode.

An Android system is capable of saving a system operating state during standby and is capable of restoring the state after being wakened; and the monitor service is configured to monitor the media file playing instruction transmitted from the mobile device associated with the display device.

In some implementations, when the media file playing instruction transmitted from the mobile device associated with the display device is not received within the preset duration (such as 60 sec), the display device shuts down the monitor service and enters the standby mode from the customized mode; the mobile device broadcasts the wakeup signal once every 10 sec, namely the wakeup signal is monitored once every 10 sec by the monitor service, so that the display device delays 60 sec before standby every time when the wakeup signal is received; and thus, the display device may be in the customized mode all the time if only the application configured for the mobile device is running in the front-end, so that the user may perform media playing at any time by operating the mobile device.

Figure 8:
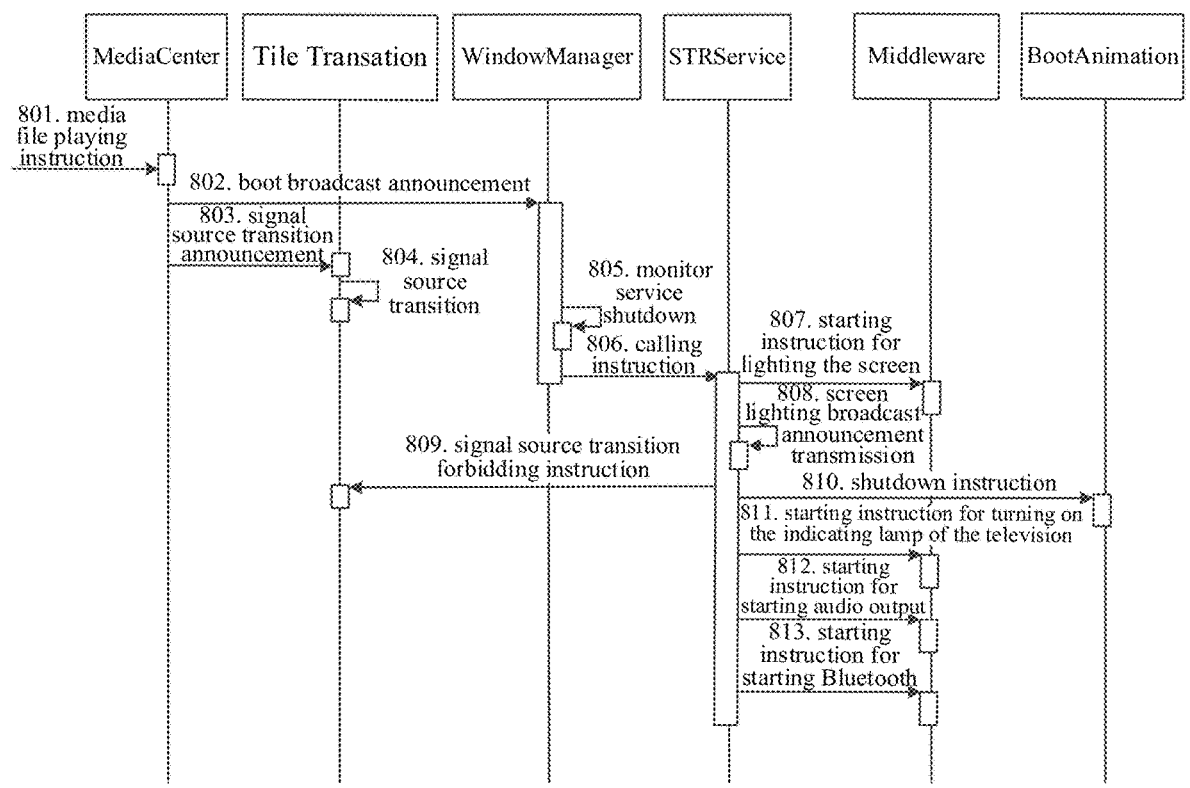
FIG. 8 is a flow diagram that the display device enters the operating mode from the customized mode according to some embodiments of the disclosure.

FIG. 8 is a flow diagram illustrating the display device entering into the operating mode from the customized mode according to some embodiments of the disclosure.

As shown in FIG. 8, the display device in the customized mode enters the operating mode when the display device receives the media file playing instruction transmitting from the mobile device. As shown in the figure, the process includes:

S801: the Media Center receives the media file playing instruction through the wireless local area network;

S802-S803: after the Media Center receives the media file playing instruction, a boot broadcast notification is transmitted to a Window Manager module, and a notification for switching signal source is transmitted to the Tile Transition.

After the Media Center receives the media file playing instruction, on the one hand, the boot broadcast notification is transmitted to the Window Manager, so that the Window Manager performs the boot process; on the other hand, the media resources are acquired according to the media file playing instruction, the media format of the media file played by the user is determined, and the notification for switching signal source is transmitted to the Tile Transition according to the media format, so that the Tile Transition switches from a signal source to another signal source corresponding to the media format.

S804: after the Tile Transition receives the notification for switching signal sources, the playing interface is switched to the corresponding playing interface.

In a scenario where the signal source before standby is DTV source and the signal source for the media file required by the user is ATV, the display device will switch to a virtual signal source, and after the media center service transmits a signal source transition request to the signal source transition service, the signal source transition service switches from the virtual signal source to the ATV signal source and playing according to the indication formation, instead of switching to DTV signal source and playing.

S805-S806: after the Window Manager receives the boot broadcast notification, the monitor service is shut down, and the STR Service is called.

S807-S813: after the STR Service is called, the screen is lighted, the screen lighting broadcast notification is transmitted, the Tile Transition is instructed to disable signal source transition, the boot animation playing is shut down, and the Middleware is instructed to cancel audio mute and start the external device service such as the power indicator of the display device and Bluetooth, so that the display device enters the operating mode.

After the screen lighting broadcast notification is transmitted, the Tile Transition may be triggered to transition the current signal source to the signal source before standby, and the Tile Transition has transitioned the signal source to the signal source corresponding to the media file required by the user in S804, so that the transition for restoring to the signal source before standby which is a routine for Tile Transition is forbidden after the Tile Transition receives the screen lighting broadcast notification.

In some embodiments of the disclosure, the display device in the standby mode is wakened in advance by the wakeup signal broadcast from the mobile device so as to start some of services to enter the customized mode, in this way, the display device may be triggered to enter the operating mode from the customized mode and perform media playing when the user operates the mobile device associated with the display device, so that the display device in the standby mode is wakened by the mobile device, the time delay from the standby mode to media playing is shortened, and the user experience of the user is improved.

Although the preferred embodiments of the disclosure have been described, the skilled in the art may obtain other alterations and modifications of the embodiments once they know a basic creative concept. Therefore, the appended claims intend to cover the preferred embodiments as well as any alternations and modifications falling into the scope of the claims.

It is apparent that various alternations and variations for the disclosure may be made by the skilled in the art without departing from the spirit and scope of the disclosure. Thus, the disclosure also intends to include the alternations and variations even if the alternations and variations of the disclosure fall within the scope of the claims and the equivalent technologies thereof of the disclosure.

The invention claimed is:

1. A method for playing a media file on a display device, comprising:
    receiving, by a display device being in a standby mode, a wakeup signal broadcasted from a mobile device through a wireless module of the display device, the display device comprising a memory, the wireless module, a power manager module and a processor in communication with the memory; wherein the display device is configured to have the standby mode, a customized mode different from the standby mode, and a normal operating mode;
    triggering, by the display device according to the wakeup signal, an electrical level change to causes the display device to enter into the customized mode where the display device is started but a screen of the display device is not lighted and a monitor service is started additionally with respect to the standby mode, wherein the display device in the customized mode is discoverable by the mobile device so as to associate the display device with the mobile device, and the electrical level change is triggered by pulling down a level of a universal output/input interface connected with the power manager module by the wireless module; and
    receiving, by the display device in the customized mode, a push instruction for playing a media file transmitting from the mobile device via the monitor service, lighting the screen of the display device, and playing the media file according to the push instruction so as to make the display device enter the normal operating mode.

2. The method according to claim 1, wherein the playing the media file according to the push instruction comprises:
    acquiring, by the display device according to a local media file address of the mobile device contained in the push instruction, a local media file from the mobile device; and
    playing, by the display device, the local media file.

3. The method according to claim 1, wherein the playing the media file according to the push instruction comprises:
    acquiring, by the display device according to a media file source address contained in the push instruction, an online media file from a network server corresponding to the media file source address; and
    playing, by the display device, the online media file.

4. The method according to claim 3, further comprising:
    starting, by the display device upon entering the customized mode, the monitor service to monitor the push instruction transmitting from the mobile device.

5. The method according to claim 4, further comprising:
    shutting down, by the display device after receiving the push instruction transmitting from the mobile device, the monitor service.

6. The method according to claim 4, further comprising:
    determining, by the display device in the customized mode, whether the push instruction transmitting from the mobile device associated with the display device is received or not within a preset duration;
    in response to not receiving the push instruction within the preset duration, making the display device enter the standby mode, and keeping the wireless module on in the standby mode.

7. The method according to claim 3, further comprising:
    setting, by the display device upon entering the customized mode, the display device in audio mute.

8. The method according to claim 7, further comprising:
    cancelling, by the display device after receiving the push instruction, the audio mute.

9. The method according to claim 8, further comprising:
    directly playing, by the display device after lighting the screen of the display device, the media file according to the push instruction, without playing a boot animation.

10. A display device for playing a media file, comprising:
    a memory storing instructions;
    a wireless module;
    a power manager module; and
    a processor in communication with the memory, wherein, when the processor executes the instructions, the processor is configured to cause the display device to:
    while the display device is in a standby mode, receive a wakeup signal broadcasted from a mobile device through the wireless module in the display device, wherein the display device is configured to have the standby mode, a customized mode different from the standby mode, and a normal operating mode;
    trigger an electrical level change according to the wakeup signal, to cause the display device to enter into the customized mode where the display device is started but a screen of the display device is not lighted and a monitor service is started additionally with respect to the standby mode, wherein the display device in the customized mode is discoverable by the mobile device so as to associate the display device with the mobile device, and the electrical level change is triggered by pulling down a level of a universal output/input interface connected with the power manager module by the wireless module; and
    while the display device is in the customized mode, receive a push instruction for playing a media file transmitting from the mobile device via the monitor service, light the screen of the display device, and play the media file according to the push instruction so as to make the display device enter the normal operating mode.

11. The display device according to claim 10, wherein, when the processor is configured to cause the display device to play the media file according to the push instruction, the processor is configured to cause the display device to:
    acquire, according to a mobile device local media file address contained in the push instruction, a local media file from the mobile device; and
    play the local media file.

12. The display device according to claim 10, wherein, when the processor executes the instructions, the processor is configured to further cause the display device to:
    upon entering the customized mode, start the monitor service to monitor the push instruction transmitting from the mobile device.

13. The display device according to claim 12, wherein, when the processor executes the instructions, the processor is configured to further cause the display device to:
    shut down the monitor service after receiving the push instruction transmitting from the mobile device.

14. The display device according to claim 12, wherein, when the processor executes the instructions, the processor is configured to further cause the display device to:
    during the customized mode, determine whether the push instruction transmitting from the mobile device associated with the display device is received or not within a preset duration; and in response to not receiving the push instruction within the preset duration, make the display device enter the standby mode, and keep the wireless module power on in the standby mode.

15. The display device according to claim 10, wherein, when the processor is configured to cause the display device to play the media file according to the push instruction, the processor is configured to cause the display device to:
   acquire, according to a media file source address contained in the push instruction, an online media file from a network server corresponding to the media file source address; and
   play the online media file.

16. The display device according to claim 15, wherein, when the processor executes the instructions, the processor is configured to further cause the display device to:
   upon entering the customized mode, set the display device in audio mute.

17. The display device according to claim 16, wherein, when the processor executes the instructions, the processor is configured to further cause the display device to:
   cancel the audio mute after receiving the push instruction transmitting from the mobile device.

18. The display device according to claim 17, wherein, when the processor executes the instructions, the processor is configured to further cause the display device to:
   after the screen of the display device is lighted, directly play the media file according to the push instruction, without playing a boot animation.

* * * * *